United States Patent [19]

Grupping

[11] Patent Number: 4,808,029

[45] Date of Patent: Feb. 28, 1989

[54] SYSTEM FOR SUBTERRANEAN STORAGE OF ENERGY

[76] Inventor: Arnold W. J. Grupping, Anjelierenlaan 3, 2111 BP Aerdenhout, Netherlands

[21] Appl. No.: 53,069

[22] Filed: May 21, 1987

[30] Foreign Application Priority Data

May 26, 1986 [NL] Netherlands ............ 8601342

[51] Int. Cl.⁴ .................................. B65G 5/00
[52] U.S. Cl. .......................... 405/59; 60/398
[58] Field of Search ............ 405/53, 59, 75; 60/398

[56] References Cited

U.S. PATENT DOCUMENTS 3,996,741 12/1976 Herberg .................. 60/398
4,261,419 4/1981 Probstein ............... 405/53 X
4,538,414 9/1985 Saleh ................... 405/59 X Primary Examiner—David H. Corbin
Attorney, Agent, or Firm—Beehler, Pavitt, Siegemund, Jagger, Martella & Dawes

[57] ABSTRACT

A system for subterranean storage of energy comprises a lower and a higher cavern formed in a subterranean salt formation, both caverns being partially filled with salt solution, a gas supply for pressurizing a head space in each cavern, a first channel interconnecting the liquid filled portions of the caverns, a second channel interconnecting the pressurized head spaces, and a pumping-generating plant at the ground surface connected between two vertical branches of the first channel. The plant is operable for pumping liquid through the first channel from the lower to the higher cavern when supplied with energy, or for generating energy when driven by liquid flowing through the first channel from the higher to the lower cavern. The gas supply maintains a pressure equal or greater to the hydrostatic pressure differential between the liquid filled spaces in the caverns and also sufficient for driving the liquid from the lower cavern to the ground surface.

7 Claims, 1 Drawing Sheet

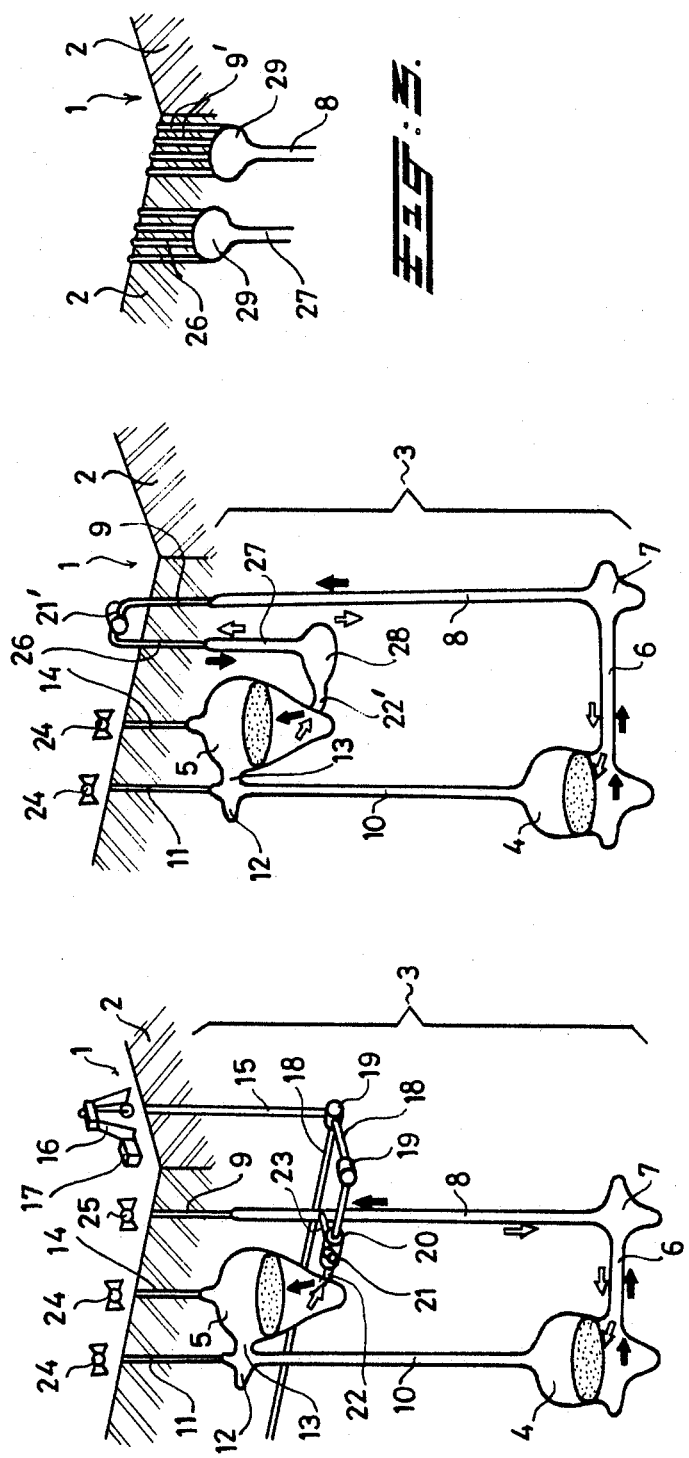

SYSTEM FOR SUBTERRANEAN STORAGE OF ENERGY

There has been a long-standing need for a system for storing energy, enabling the turbo-generators and the heat source of an electric power station to work at a given constant load, in which, during the time that the energy demand is lower than the energy produced, the surplus energy is supplied to the system, and during the time that the demand is larger, the stored energy can be converted into electric energy again so as to supplement the shortage.

Such a system will allow an optimum utilization of the heat source and the turbo-generators, which will lead to substantial savings, whilst also an efficient use of fuel, which will become scarce, can be made.

For this purpose only systems have been considered up till now in which the surplus energy is used for pumping water to a higher level, after which the water flowing back can be used again for generating electric energy. To that end use can be made of reversible hydro-electric assemblies, the electric part thereof being adapted to operate as a motor and generator respectively, and the hydraulic part as a pump and driving turbine respectively, but it is, obviously, also possible to use separate assemblies therefor. Since, in view of the construction of the hydraulic part, limits are imposed on the water flow, the pumping height should be chosen accordingly. The consequence thereof is that such systems have only been applied in regions with sufficient differences in ground level. Constructing water basins with a sufficient water level by means of high dikes, e.g. in estuaries, is possible as such, but is very expensive, and high dikes will be virtually unacceptable because of the disturbance of the landscape, and serious damage to such dikes will have disastrous consequences.

It has already been proposed to use, for this purpose, caverns in salt formations that remain after the salt has been removed therefrom by introducing water, and the salt extraction therefrom has been discontinues because given maximally allowable dimensions have been reached. To that end two caverns laying at different depths which are interconnected by means of a channel should be used, and the energy conversion assembly must be located at the level of the lower cavity. In view of the considerable depths and thicknesses of such salt formations this will be extremely expensive, in particular because of the deepening of shafts and excavating of galleries for transporting the parts of such assemblies, and, moreover, operations required for maintenance etc. must take place under very unfavourable conditions.

Recently an improvement of this known system has been proposed, in which the energy conversion assembly can be located near the lower side of the higher cavern. In this system the lower sides of both caverns, containing brine, are interconnected by means of a first channel, and the gas spaces of both caverns are interconnected by means of a second channel, the energy conversion assembly being included in the first channel and the gas pressure being made substantially equal to the hydrostatic pressure difference between the liquid containing lower sides of both caverns, so that, then, the pressure at the suction side of said assembly will be substantially equal to zero, said channels being made so wide that the pressure drop in the flowing liquid and gas will be negligible. The pump should then be able to provide a liquid pressure corresponding to the gas pressure, so that the liquid will be driven upwards in the first channel by the gas pressure.

Although, in this manner, it will be possible to work at substantially shallower depths, the objection remains that parts of the energy conversion assembly must be lowered through wide mine shafts, so that the cost will still be considerable and the working conditions will remain unfavourable.

The invention provides an improvement of the above-mentioned system avoiding said drawbacks. This system is characterised in that said assembly is located at the ground surface and is connected, by means of two branches of said first channel, with the lower sides of the lower and upper caverns respectively, the gas pressure being chosen such that on the one hand the liquid is driven from the lower cavern towards the ground surface, and on the other hand no cratering towards the ground surface can take place.

In this manner the substantial cost of locating said energy conversion assembly underground can be saved, and all channels and connections can be made by means of the current drilling and washing techniques.

The caverns, channels and interconnections located in the salt formation are made by washing out the salt, which is done through boreholes from the ground surface, said boreholes being provided with casings, which do not extend further than is required by the previously mentioned pressure condition.

An energy storage system making use of two subterranean caverns, in which the energy conversion assembly is placed above the ground level, has been proposed before, but therein boreholes and channels are used, which are provided with casings extending downwards to the lower sides of said caverns, which is extremely expensive; this known system does not comprise subterranean interconnections between both caverns.

Since, in the formations overlying the salt formation, only drilling is possible, and the boreholes will be narrower than the channels washed out in the salt, it is advisable to choose the height difference between the liquid levels in both caverns so much larger that the pressure drop in the narrower portions of said branches is compensated.

In order to reduce the flow resistance in the branch portions of said first channel above the salt formation as much as possible, said branch portions can be formed, in particular, by a plurality of boreholes connected in parallel.

The connection between said parallel boreholes and the corresponding branches of said first channel can be formed by laterally washing out two cavities in the salt by means of one or more of said boreholes.

In order to obtain a liquid pressure as high as possible, the vertical distance between both caverns should be made as large as possible. Furthermore it will be favourable to make the width-to-height ratio of said caverns as large as possible since, then, the pressure difference during the energy recuperation will change as little as possible.

In particular the system of the invention can be designed so that the part of said assembly serving for driving the pump is at least partly adapted to be fed with gas produced by subterranean coal gasification.

The invention will be elucidated below in more detail by reference to a drawing, showing in:

FIG. 1 a diagrammatic representation of a known system for subterranean energy storage;

FIG. 2 a diagrammatic representation corresponding to FIG. 1 of the system according to the invention; and FIG. 3 a modified embodiment of a portion of the system of FIG. 2.

In FIG. 1 a recently proposed system is diagrammatically shown. Therein the ground surface is indicated at 1, the overlying formations at 2, and a subterranean salt formation at 3, the depths of the various formations not being shown on scale.

From the surface 1 two large caverns 4 and 5 have been washed out in the known manner, which caverns are situated at different depths and, for instance, have been used before for salt extraction.

The lower cavern 4 is connected, by means of a transverse channel 6 and an auxiliary cavity 7, to a vertical channel 8, the latter communicating, by means of a borehole 9 through the formations 2, with the ground surface 1. After the channel 8 has been washed out through the borehole 9, the cavity 7 is formed in the known manner by supplying oil for preventing an upward washing out, so that, by laterally washing, the connection 6 with the cavern 4 can be formed.

The upper side of the cavern 4 is connected to a washed-out vertical channel 10 which, by means of a borehole 11, communicates with the ground surface 1, said borehole 11 and channel 10 having served for forming the cavern 4. Near the upper side of the upper cavern 5, and, by means of an auxiliary cavity 12, a connection 13 with the upper side of the cavern 5 is formed, the latter, moreover, communicating, via a borehole 14 having served for forming the cavern 5, with the ground surface 1.

Furthermore a mine shaft 15 is deepened from the surface 1, and at the upper side thereof an elevator tower 16 and an engine room 17 are present, so as to allow equipment and personnel to be lowered by means of an elevator. Said shaft 15 extends down to the level of the lower part of the cavern 5, and communicates, via substantially horizontal mine galleries 18 and intermediary chambers 19, with the vicinity of the lower side of said cavern 5 ad possibly further caverns 5.

Near the cavern 5 an engine space 20 is situated, in which a hydro-electric assembly 21 is installed, consisting of a pump/turbine and a motor/generator connected thereto, said assembly beinng adapted to operate either as a motor driven liquid pump or a turbine driven generator.

The pump/turbine of this assembly is connected, via a channel 22, to the cavern 5, and via a channel 23 to the vertical channel 8. The electric cables for conveying the electric energy generated by said generator, or the electric energy to be supplied to the motor respectively, run through the galleries 18 and up the shaft 15. Said cables are not shown in the drawing.

The operation of this system is as follows. Via gate valves 24 and the vertical boreholes 11 and 14, sufficient gas pressure is formed in the upper parts of the caverns 4 and 5 to counteract the pressure of the liquid column in the channel 8. Furthermore so much liquid will be displaced from said caverns, that, as shown, free gas spaces will remain on top thereof.

By means of gate valves, not shown, near the assembly 21, the connection 22 between the channel 8 and the cavern 5 is closed, so that, after opening the valve 25 at the upper end of the borehole 9, the liquid in this channel 8 will be driven upwards past the channel 23, and thereafter the valve 25 is closed. The pressure at channel 23, is, then, zero or positive.

After starting the assembly 21, having a pump which is capable or generating a pressure at least equal to the gas pressure generated, the connection with the cavern 5 is opened, so that, now, liquid from the channel 8 is sucked in and is pumped into the cavern 5, the gas pressure pushing liquid from the cavern 4 towards the channel 8 as indicated by black arrows. This takes place during periods of low load on the associated power network, and the energy surplus is used for pumping.

As soon as the energy demand of the network increases beyond the average load value, the assembly 21 is switched over to energy production, the liquid then flowing through the turbine of said assembly (which can be the pump), and the generator (which can be the motor) is driven thereby. This has been indicated by white arrows.

The advantage of this system over other systems in which the assembly 21 is located at the level of the lower side of the cavern 4, is that the shaft 15 can be deepened to a substantially smaller depth, which does not only provide substantial savings, but also much less disagreeable working conditions for the operating personnel. Deepening the shaft 15, excavating the galleries 18 and assembling the assembly 21 underground remains, however, very expensive, and working underground is very disagreeable for the personnel.

The channels 8 and 10 are so wide that the friction resistance of the flowing liquid and gas will be negligible. In the case of gas losses from the caverns 4 and 5, gas can be supplemented by means of pumps, not shown, via the boreholes 11 or 14.

FIG. 2 shows the system of the invention, in which the same reference numerals are used for corresponding parts, primed in the case of parts slightly differing from the known ones.

The channel 8 is, now, no longer connected to the cavern 5. By means of a borehole 26 an additional vertical washed-out channel 27 has been formed, communicating, by means of an auxiliary cavity 28 and a transverse connection 22′, with the lower side of the cavern 5. The boreholes 9 (of channel 8) and 26 (of channel 27) are connected, above the ground surface 1, to a hydro-electric assembly 21′ corresponding, to the assembly 21.

The gas pressure is now chosen such that it is sufficient for overcoming the liquid pressure in the channel 8 up to the ground surface 1, so that, at the pump suction of the assembly 21′, the pressure will be zero or positive. During the operation of the pump, the liquid pressure in the channel 27 acts in the flow sense, so that, actually, the pump discharge needs to produce a pressure which is lower than the gas pressure.

The gas pressure in the cavern 5 should not be so high that the ground pressure would be overcome and cratering to the ground surface would occur, this, of course, with a certain safety factor. This determines the minimum depth of the cavern 5, which should, for the rest, be chosen as shallow as possible. The desired liquid pressure difference between the caverns 5 and 4, depending on the desired energy production at a determined liquid flow rate, determines the difference in depth between both caverns.

The following calculation will elucidate the preceding, starting from a density $\rho = 1.2$ Mg/m$^3$ of the brine solution in the caverns, so that 1 m brine column corresponds to a pressure of 0.012 MPa. Furthermore the depth of the cavern 5 is indiated by x, and that of the cavern 4 by y, and the allowable pressure gradient above the cavern 4 up to the ground surface (incl. a safety factor) is assumed to be 0.02 MPa/m. The gas pressure is indicated by p.

In order to obtain, at the ground surface 1, a pressure 0 in the borehole 9, the following holds:

$$p - 0.012 \cdot y = 0 \text{ or } y = 83.33 \cdot p$$

$$y - x = h \text{ or } 83.33 \cdot p = x + h$$

In order to obtain, at a minimal value of x, a maximal value of h, the pressure p should be as large as possible, taking into account that the ground pressure should withstand said pressure, i.e.:

$$p_{max} = 0.02 \cdot x$$

from which follows:

$$x + h = y = 83.33 \cdot 0.02 \cdot x = 1.67 \cdot x$$

$$h = 0.67 \cdot x = 0.4 \cdot y, \; x/y = 0.6$$

The pressure difference between the caverns 5 and 4 will be:

$$\Delta p = 0.012 \cdot h = 0.008 \cdot x = 0.0048 \cdot y$$

If $\Delta p = 6$ MPa:

$$x = 750 \text{ m}, \; y = 1250 \text{ m and } h = 500 \text{ m}.$$

The gas pressure is, then, 15 MPa.

In the system of FIG. 1 a corresponding calculation under the same conditions of h = 500 m or $\Delta p$ = 6 MPa, produces x = 300 m and y = 800 m, and the gas pressure is 6 MPa.

For the same pressure difference the caverns 4 and 5, in the system of FIG. 2, should, therefore, be made 450 m deeper than in the system of FIG. 1, but this is (assuming that the salt formation is sufficiently thick and is situated at a sufficient depth) much cheaper than deepening the mine shaft and excavating the galleries of FIG. 1. A smaller difference in depth might of course be accepted, if either the flow rate through the turbine can be made larger accordingly, or a lower energy yield would be acceptable.

In the system of FIG. 2 the friction in the narrower boreholes may be considerable. Therefore it may be favourable to form, as indicated in FIG. 3, auxiliary cavities 29 at the upper ends of the channels 8 and 27, and to use as many parallel boreholes 9' and 26' as are required for sufficiently reducing the friction. It will be clear that, instead thereof, the boreholes 9 and 26 can be made sufficiently wide for this purpose, if the cost of such cased boreholes is not an objection.

In order to obtain, during the operation of the system, the smallest possible variation of the pressure difference $\Delta p$, it may be favourable to make the width/length ratio of both caverns 4 and 5 as large as possible.

Since the assembly 21' has now been located above ground, also other energy sources can be used for pumping, e.g. gas available above ground. In particular gas can be used which is obtained by underground gasification of coal, in particular when also deeper coal layers are present in situ.

For that matter it will be clear that in respect of the channel 27 and, as the case may be, the additional corresponding cavity 29, at the pressure side, the same restriction applies as in respect of the depth of the cavern 5, in order to obtain a sufficient ground pressure which is able to withstand the liquid pressure.

The various boreholes, 9, 9', 11, 14, 26 and 26' are, as is customary, provided with a suitable casing so as to prevent collapsing thereof, penetration of ground water or the like, and, in particular, gas or liquid leaks, but such casings should not extend deeper than required by the actual pressure conditions so as to reduce the installation cost accordingly.

I claim:

1. A system for subterranean storage of energy, comprising:
   a first and a second cavern formed in a subterranean salt formation, said first cavern being situated at a considerably lower level than said second cavern;
   a first channel interconnecting the lower portions of said caverns;
   a second channel interconnecting the upper portions of said caverns;
   both said caverns being partially filled with salt solution;
   gas supply means for pressurizing a head space in each said cavern above said salt solution;
   said first channel interconnecting the liquid filled portions of said caverns, said second channel interconnecting said head spaces of said caverns; and
   a pumping-generating assembly including turbine/pump means arranged at the ground surface and connected between two vertical branches of said first channel, said assembly being adapted for pumping liquid through said first channel from said first towards said second cavern when supplied with energy, and for generating energy when driven by liquid flowing back through said first channel from said second towards said first cavern;
   said gas supply means being adapted to maintain a gas pressure in said caverns such that the difference between said gas pressure and hydrostatic pressure differential between the liquid filled spaces in said caverns is equal to or greater than zero, said gas pressure being also sufficient for driving the liquid from said first cavern to the ground surface;
   said channels having sufficient width so that pressure drop in the liquid flowing therein is negligible.

2. The system of claim 1, in which those parts of said channels which extend towards the ground surface are defined by cased boreholes along channel portions extending from said surface downwards through upper ground formations overlying the salt formation to a level sufficiently deep for avoiding cratering of gas and/or liquid towards the ground surface.

3. The system of claim 1, wherein said branches of said first channel extending through said upper formations are narrower than the channel portions in said salt formations, the height difference between the liquid levels in said caverns being made sufficiently greater than that necessary to maintain said desired hydrostatic pressure difference so that the pressure drop in said narrower portions is compensated thereby.

4. The system of claim 3, in which the branch portions of said first channel above the salt formation each consist of a plurality of boreholes connected in parallel, the interconnection between the lower ends of said parallel boreholes and the upper end of the vertical channel part being formed by corresponding cavities washed out from the salt formation.

5. The system of claim 1, in which the vertical distance between said first and second caverns is maximized within the dimensions of an existing salt formation.

6. The system of claim 1, wherein the width-to-height ratio of both caverns is maximized for a given volume of liquid in said caverns.

7. The system of claim 2, further comprising means for powering said assembly in its pumping mode at least partly with combustible gas obtained by underground gasification of natural coal deposits in the vicinity of said salt formation.

* * * * *